(12) United States Patent
Saarikko

(10) Patent No.: US 8,508,848 B2
(45) Date of Patent: Aug. 13, 2013

(54) EXIT PUPIL EXPANDERS WITH WIDE FIELD-OF-VIEW

(75) Inventor: Pasi Saarikko, Espoo (FI)

(73) Assignee: Nokia Corporation, Espoo (FI)

(*) Notice: Subject to any disclaimer, the term of this patent is extended or adjusted under 35 U.S.C. 154(b) by 397 days.

(21) Appl. No.: 12/745,793

(22) PCT Filed: Dec. 18, 2007

(86) PCT No.: PCT/IB2007/003960
§ 371 (c)(1),
(2), (4) Date: Jul. 26, 2010

(87) PCT Pub. No.: WO2009/077802
PCT Pub. Date: Jun. 25, 2009

(65) Prior Publication Data
US 2010/0296163 A1   Nov. 25, 2010

(51) Int. Cl.
*G02B 5/18* (2006.01)
(52) U.S. Cl.
USPC .......................................................... 359/567
(58) Field of Classification Search
USPC ................. 359/630, 634, 13, 15–16, 566–57, 359/636; 385/37; 345/7–9
See application file for complete search history.

(56) References Cited

U.S. PATENT DOCUMENTS
2004/0062502 A1   4/2004   Levola .......................... 385/129

FOREIGN PATENT DOCUMENTS

| EP | 1542062 A1 | 6/2005 |
|---|---|---|
| EP | 1804103 A1 | 7/2007 |
| WO | WO 99/52002 | 10/1999 |
| WO | WO 2006/064301 A1 | 6/2006 |
| WO | WO-2006/098097 A1 | 9/2006 |
| WO | WO 2007/141587 A1 | 12/2007 |
| WO | WO 2007/141589 A1 | 12/2007 |
| WO | WO 2009/077803 A1 | 6/2009 |

OTHER PUBLICATIONS

Sheriv et al., "Compact Holographic Beam Expander," *Optic letters*, vol. 18, No. 15; Aug. 1, 1993 (3 pages).
Sauer, "Fabrication of Diffractive-reflective Optical Interconnects for Infra-Red Operation Based on Total Internal Reflection," *Applied Optics*, vol. 28, No. 2; Jan. 15, 1989 (3 pages).
Shechter et al., "Compact red-green-blue beam illuminator and expander," *Applied Optics*, vol. 41, No. 7; Mar. 1, 2002 (7 pages).
Shechter et al., "Compact beam expander with linear grating," *Applied Optics*, vol. 41, No. 7; Mar. 1, 2002 (5 pages).
Amitai et al., "Visor display design based on planar holographic optics," *Applied Optics*, vol. 34, No. 8; Mar. 10, 1995 (5 pages).
Levola, T., "7.1: Invited Paper, Novel Diffractive Optical Components for Near to Eye Displays", SID Symposium Digest of Technical Papers, Jun. 2006, vol. 31, Issue 1, pp. 64-67.
Levola, T., "28.2 Stereoscopic Near to Eye Display using a Single Microdisplay", SID Symposium Digest of Technical Papers, May 2007, vol. 38, Issue 1, pp. 1158-1159.
Levola, T., "Diffractive Optics for Virtual Reality Displays", SID Symposium Digest of Technical Papers, 2005, paper 22.1, pp. 1-26.

*Primary Examiner* — Stephone Allen
*Assistant Examiner* — Kimberly N Kakalec
(74) *Attorney, Agent, or Firm* — Harrington & Smith

(57) ABSTRACT

The specification and drawings present a new apparatus and method for providing a wide field-of-view as well as illumination uniformity in exit pupil expanders (EPE) using stacked EPE substrates (or plates) with non-symmetric exit pupil expansion that use a plurality of diffractive elements for expanding the exit pupil of a display for viewing.

25 Claims, 10 Drawing Sheets

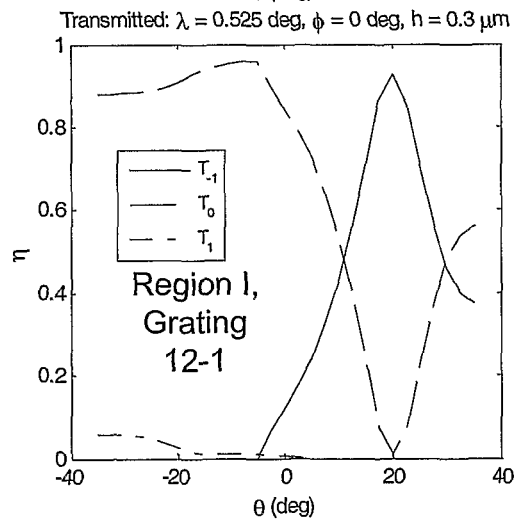
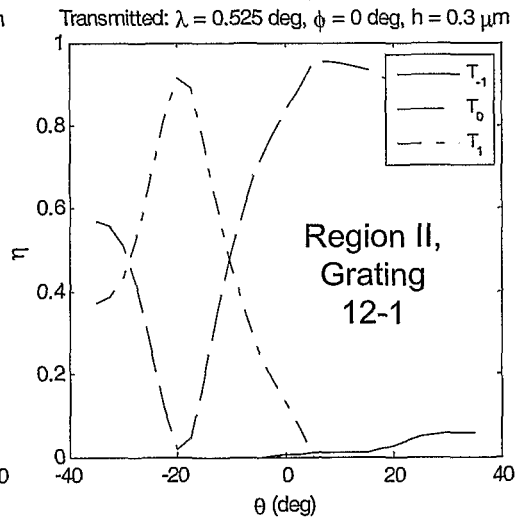
Figure 4c         Figure 4d

EXIT PUPIL EXPANDERS WITH WIDE FIELD-OF-VIEW

TECHNICAL FIELD

The present invention relates generally to display devices and, more specifically, to providing a wide field-of-view as well as illumination uniformity in exit pupil expanders that use a plurality of diffractive elements for expanding the exit pupil of a display for viewing.

BACKGROUND ART

The Field-of-View (FOV) of diffractive Exit Pupil Expanders (EPEs) used with Near-to-Eye Displays (NEDs) is typically limited by the refractive index of the available EPE substrate materials. When used with polychromatic light, and neglecting the effect of a display aspect ratio, the horizontal FOV limit can be expressed as ($\theta_H$ is a half angle of the FOV):

$$\sin\theta_H = \frac{\lambda_{min} n_2 - \lambda_{max} n_1}{n_1(\lambda_{min} + \lambda_{max})}, \quad (1)$$

wherein $n_2$ is the refractive index of the EPE substrate (or plate), $n_1$ is the refractive index of the surrounding material, and $\lambda_{min}$ and $\lambda_{max}$ are minimum and maximum wavelengths of the polychromatic light, respectively. Equation 1 is valid for symmetric exit pupil expansion, i.e., the grating period of the in-coupling diffraction grating is selected so that the horizontal acceptance angles for light guiding are equal for both +1 and −1 diffraction orders.

Equation 1 shows that the FOV of a planar EPE is limited by the refractive index of the materials and the wavelength band of the incident light. For example, using EPE substrate material MGC171 (manufactured by MITSUBISHI GAS CHEMICALS) with the refractive index of $n_2$=1.71 and $n_1$=1 (for air as the surrounding material) we get a theoretical FOV limit of about 40 degrees (full width equal to $2\theta_H$) for blue light ($\lambda$=465 nm) having 10 nm wavelength bandwidth. When using one EPE plate for blue (465 nm) and green (540 nm) light components and a substrate with $n_2$=1.71, the FOV is reduced to about 29 degrees. If a high index material of $n_2$=2 is used, the FOV limit for the 10 nm wavelength bandwidth and blue light (465 nm) is about 58 degrees, but for the wavelength band covering the visible spectra ($\lambda_{max}$=450 nm and $\lambda_{max}$=650 nm) the FOV limit is only about 26 degrees.

Looking at the examples presented herein, it is clear that separate EPE plates with refractive index approaching n=2 are required for each RGB (red, green, blue) color to reach the viewing conditions of a typical PC desktops monitor. In practice, such materials are not readily available so other operating principles are needed.

DISCLOSURE OF THE INVENTION

According to a first aspect of the invention, an apparatus, comprises: a first substrate of optical material having a first surface and a second surface which is opposite to the first surface; an in-coupling diffractive element disposed on the first or the second surface of the first substrate; one or more out-coupling diffractive elements disposed on the first or the second surface, wherein the in-coupling diffractive element is configured to diffract optical rays of the input optical beam, which are incident from one half space relative to a plane perpendicular to the first substrate and parallel to periodic lines of the in-coupling diffractive element, so as to provide one diffracted optical beam substantially within the first and second surfaces such that at least a portion of the one diffracted optical beam is coupled only to one of the one or more out-coupling diffractive elements; a second substrate of optical material having a further first surface and a further second surface and being positioned substantially parallel to the first substrate and in juxtaposed spaced relationship hereto, wherein the further second surface is opposite to the further first surface; a further in-coupling diffractive element disposed on the further first or the further second surface substantially in alignment with the in-coupling diffractive element and having further periodic lines parallel to the periodic lines of the in-coupling diffractive element, and configured to receive a portion of the input optical beam which propagates through the first substrate into the further substrate; and one or more further out-coupling diffractive elements disposed on the further first or the further second surface and each being substantially opposite to a corresponding diffractive element of the one or more out-coupling diffractive elements, wherein the further in-coupling diffractive element is configured to diffract optical rays of the portion of the input optical beam, which are incident from another half space relative to the plane, to provide a further one diffracted optical beam substantially within the further first and further second surfaces such that at least a portion of the further diffracted optical beam is coupled only to one of the one or more further out-coupling diffractive elements which is opposite to the one of the one or more out-coupling diffractive elements, and wherein the one of the one or more out-coupling diffractive elements is configured to couple by diffraction parts of the one diffracted optical beam from the first substrate for providing an output optical beam out of the first substrate with an expanded exit pupil in one or two dimensions, the output optical beam being propagated through the second substrate, and the one of the one or more further out-coupling diffractive elements is configured to couple by diffraction parts of the further one diffracted optical beams from the second substrate for providing a further output optical beam out of the second substrate with the expanded exit pupil in the one or two dimensions.

According further to the first aspect of the invention, the in-coupling diffractive element may be further configured to diffract optical rays of the input optical beam, which are incident from another half space relative to the plane, to provide another diffracted optical beam substantially within the first and second surfaces such that at least a portion of the another diffracted optical beam is coupled only to another of the one or two out-coupling diffractive elements, wherein the further in-coupling diffractive element may be configured to diffract optical rays of the portion of the input optical beam, which are incident from the one half space relative to the plane, to provide a further another diffracted optical beam substantially within the further first and further second surfaces such that at least a portion of the further another diffracted optical beam is coupled only to another of the one or two further out-coupling diffractive elements which is opposite to the another of the one or more out-coupling diffractive elements, wherein the one and another of the one or more out-coupling diffractive elements may be configured to couple by diffraction parts of the one and another diffracted optical beams from the first substrate for providing two output optical beams out of the first substrate with the expanded exit pupil in one or two dimensions, the output optical beams being propagated through the second substrate, and the one and another of the further one or more diffractive elements may be configured to couple by diffraction parts of the further one and further another diffracted optical beams from the second substrate for providing two further output optical beams out of the second substrate with the expanded exit pupil in the one or two dimensions. Still further, each of the two output optical beams and a corresponding each of the two further output optical beams may substantially coincide at a predetermined distance range from the second substrate. Yet still further, the one and another of the one or more out-coupling diffractive elements may be symmetrical relative to the in-coupling diffractive element and the one and another of the one or more further out-coupling diffractive elements may be symmetrical relative to the further in-coupling diffractive element. Yet further still, distances from the one and another of the one or more out-coupling diffractive elements to the in-coupling diffraction element may be different than corresponding distances from the one and another of the one or more further out-coupling diffractive elements to the further in-coupling diffractive element.

Further according to the first aspect of the invention, optical rays of the output optical beam and of the further output optical beam may be substantially parallel to corresponding optical rays of the input optical beam.

Still further according to the first aspect of the invention, when using identical materials and identical surrounding material for the first and second substrates, the in-coupling diffractive element may have a period of the periodic lines equal to a maximum wavelength of the input optical beam divided by an index of refraction of the first and second substrates, and the further in-coupling diffractive element may have a further period of the further periodic lines equal to a minimum wavelength of the input optical beam divided by an index of refraction of a surrounding material of the first and second substrates.

According further to the first aspect of the invention, when using identical materials and identical surrounding material for the first and second substrates, the further in-coupling diffractive element may have a further period of the further periodic lines equal to a maximum wavelength of the input optical beam divided by an index of refraction of the first and second substrates, and the in-coupling diffractive element may have a period of the periodic lines equal to a minimum wavelength of the input optical beam divided by an index of refraction of a surrounding material of the first and second substrates.

According still further to the first aspect of the invention, a width of the in-coupling diffraction element in a direction perpendicular to the periodic lines may be different from a corresponding width of the further in-coupling diffractive element in a direction perpendicular to the further periodic lines.

According further still to the first aspect of the invention, the two or more out-coupling diffractive elements, the in-coupling diffractive element, the one or more further out-coupling diffractive elements and the further in-coupling diffractive element may have parallel periodic lines.

According yet further still to the first aspect of the invention, the apparatus may further comprise one or more further substrates, positioned substantially parallel to the first and second substrates and in juxtaposed spaced relationship thereto, with in-coupling and out-coupling diffractive elements disposed on respective surfaces of the one or more further substrates, wherein each of the one or more further substrates with the disposed diffractive elements may be substantially identical to the first substrate with the in-coupling diffractive element and the one or more out-coupling diffraction element or to the second substrate with the further in-coupling diffractive element and the one or more further out-coupling diffraction elements.

Yet still further according to the first aspect of the invention, the apparatus may further comprise one or more further substrates, positioned substantially parallel to the first and second substrates and in juxtaposed spaced relationship thereto, with in-coupling and out-coupling diffractive elements disposed on respective surfaces of the one or more further substrates, wherein each of the one or more further substrates with the disposed diffractive elements may be configured to perform a non-symmetric exit pupil extension for larger incidence angles of the input optical beam than the first substrate with the in-coupling diffractive element and the one or more out-coupling diffraction element or the second substrate with the further in-coupling diffractive element and the one or more further out-coupling diffraction elements.

Still yet further according to the first aspect of the invention, the apparatus may further comprise one or more further substrates, positioned substantially parallel to the first and second substrates and in juxtaposed spaced relationship thereto, with in-coupling and out-coupling diffractive elements disposed on respective surfaces of the one or more further substrates, wherein each of the one or more further substrates with the disposed diffractive elements may be configured to perform a symmetric exit pupil extension only for smaller incidence angles of the input optical beam than the first substrate with the in-coupling diffractive element and the one or more out-coupling diffraction element or the second substrate with the further in-coupling diffractive element and the one or more further out-coupling diffraction elements.

Still yet further still according to the first aspect of the invention, a material surrounding the first and second substrates may be air.

According still further to the first aspect of the invention, the apparatus may further comprise one or more intermediate diffractive elements disposed on the first substrate and one or more further intermediate diffractive elements disposed on the second substrate such that at least parts of the input optical beam diffracted in the in-coupling diffractive element and in the further in-coupling diffractive element may be first coupled to corresponding the one or more intermediate diffractive elements and the one or more further intermediate diffractive elements, which are configured to further couple by diffraction corresponding optical beams to the one or more out-coupling diffractive elements and to the one or more further out-coupling diffractive elements, for providing one or more output optical beams and one or more further output optical beams with the expanded exit pupil in the two dimensions.

Further according to the first aspect of the invention, the input optical beam may be emanated from a virtual image of a display or a microdisplay.

Still further according to the first aspect of the invention, grooves of the in-coupling diffractive element or the further in-coupling diffractive element may have an asymmetric groove shape and may be slanted gratings.

According to a second aspect of the invention, a method, comprises: receiving an input optical beam by an in-coupling diffractive element disposed on a first or a second surface of a first substrate, wherein the second surface is opposite to the first surface; diffracting optical rays of the input optical beam, which are incident from one half space relative to a plane perpendicular to the first substrate and parallel to periodic lines of the in-coupling diffractive element, using the in-coupling diffractive element disposed on the first or the second surface, so as to provide one diffracted optical beam substantially within the first and second surfaces such that at least a portion of the one diffracted optical beam is coupled only to one of one or more out-coupling diffractive elements disposed on the first or the further second surface of the first substrate; coupling by diffraction parts of the one diffracted optical beams from the first substrate using the one of the one or more out-coupling diffractive elements for providing an output optical beam out of the first substrate with an expanded exit pupil in one or two dimensions, and propagating the output optical beam through a second substrate, the second substrate being positioned substantially parallel to the first substrate and in juxtaposed spaced relationship hereto; receiving a portion of the input optical beam which propagates through the first substrate into the second substrate, by a further in-coupling diffractive element disposed on a further first or a further second surface of the second substrate substantially in alignment with the in-coupling diffractive element and having further periodic lines parallel to the periodic lines of the in-coupling diffractive element, wherein the further second surface is opposite to the further first surface; diffracting optical rays of the portion of the input optical beam, which are incident from the another half space relative to the plane, using the further in-coupling diffractive element to provide a further one diffracted optical beam substantially within the further first and further second surfaces such that at least a portion of the further one diffracted optical beam is coupled only to one of the one or more further out-coupling diffractive elements which is opposite to the one of the one or more out-coupling diffractive elements; and coupling by diffraction parts of the further one diffracted optical beam from the second substrate using the one of the one or more further out-coupling diffractive elements for providing a further output optical beam out of the second substrate with the expanded exit pupil in the one or two dimensions.

According further to the second aspect of the invention, the method may further comprise: diffracting optical rays of the input optical beam, which are incident from another half space relative to the plane, to provide another diffracted optical beam substantially within the first and second surfaces such that at least a portion of the another diffracted optical beam is coupled only to another of the one or two out-coupling diffractive elements, wherein the another of the one or more out-coupling diffractive elements disposed on the first or the second surface of the first substrate; coupling by diffraction parts of the another diffracted optical beam from the first substrate using another of the one or more out-coupling diffractive elements for providing another output optical beam out of the first substrate with an expanded exit pupil in one or two dimensions, and propagating the another output optical beam through the second substrate; diffracting optical rays of the portion of the input optical beam, which are incident from the one half space relative to the plane, using the further in-coupling diffractive element to provide a further another diffracted optical beam substantially within the further first and further second surfaces such that at least a portion of the further another diffracted optical beam is coupled only to another of the one or more further out-coupling diffractive elements which is opposite to the another of the one or more out-coupling diffractive elements; and coupling by diffraction parts of the further another diffracted optical beam from the second substrate using the another of the one or more further out-coupling diffractive elements for providing a further another output optical beam out of the second substrate with the expanded exit pupil in the one or two dimensions. Still further, the one and another of the one or more out-coupling diffractive elements may be symmetrical relative to the in-coupling diffractive element and the one and another of the one or more further out-coupling diffractive elements may be symmetrical relative to the further in-coupling diffractive element. Yet still further, distances from the one and another of the one or more out-coupling diffractive elements to the in-coupling diffraction element may be different than corresponding distances from the one and another of the one or more further out-coupling diffractive elements to the further in-coupling diffractive element.

Further according to the second aspect of the invention, when using identical materials and identical surrounding material for the first and second substrates, the in-coupling diffractive element may have a period of the periodic lines equal to a maximum wavelength of the input optical beam divided by an index of refraction of the first and second substrates, and the further in-coupling diffractive element may have a further period of the further periodic lines equal to a minimum wavelength of the input optical beam divided by an index of refraction of a surrounding material of the first and second substrates or, when using identical materials and identical surrounding material for the first and second substrates, the further in-coupling diffractive element may have a further period of the further periodic lines equal to a maximum wavelength of the input optical beam divided by an index of refraction of the first and second substrates, and the in-coupling diffractive element may have a period of the periodic lines equal to a minimum wavelength of the input optical beam divided by an index of refraction of a surrounding material of the first and second substrates.

Still further according to the second aspect of the invention, the two or more out-coupling diffractive elements, the in-coupling diffractive element, the one or more further out-coupling diffractive elements and the further in-coupling diffractive element may have parallel periodic lines.

According to a third aspect of the invention, an electronic device, comprises:
  a data processing unit;
  an optical engine operatively connected to the data processing unit for receiving image data from the data processing unit;
  a display device operatively connected to the optical engine for forming an image based on the image data; and
  an exit pupil expander comprising: a first substrate of optical material having a first surface and a second surface which is opposite to the first surface; an in-coupling diffractive element disposed on the first or the second surface of the first substrate; one or more out-coupling diffractive elements disposed on the first or the second surface, wherein the in-coupling diffractive element is configured to diffract optical rays of the input optical beam, which are incident from one half space relative to a plane perpendicular to the first substrate and parallel to periodic lines of the in-coupling diffractive element, so as to provide one diffracted optical beam substantially within the first and second surfaces such that at least a portion of the one diffracted optical beam is coupled only to one of the one or more out-coupling diffractive elements; a second substrate of optical material having a further first surface and a further second surface and being positioned substantially parallel to the first substrate and in juxtaposed spaced relationship hereto, wherein the further second surface is opposite to the further first surface; a further in-coupling diffractive element disposed on the further first or the further second surface substantially in alignment with the in-coupling diffractive element and having further periodic lines parallel to the periodic lines of the in-coupling diffractive element, and configured to receive a portion of the input optical beam which propagates through the first substrate into the further substrate; and one or more further out-coupling diffractive elements disposed on the further first or the further second surface and each being substantially opposite to a corresponding diffractive element of the one or more out-coupling diffractive elements, wherein the further in-coupling diffractive element is configured to diffract optical rays of the portion of the input optical beam, which are incident from another half space relative to the plane, to provide a further one diffracted optical beam substantially within the further first and further second surfaces such that at least a portion of the further diffracted optical beam is coupled only to one of the one or more further out-coupling diffractive elements which is opposite to the one of the one or more out-coupling diffractive elements, and wherein the one of the one or more out-coupling diffractive elements is configured to couple by diffraction parts of the one diffracted optical beam from the first substrate for providing an output optical beam out of the first substrate with an expanded exit pupil in one or two dimensions, the output optical beam being propagated through the second substrate, and the one of the one or more further out-coupling diffractive elements is configured to couple by diffraction parts of the further one diffracted optical beams from the second substrate for providing a further output optical beam out of the second substrate with the expanded exit pupil in the one or two dimensions.

According further to the third aspect of the invention, the in-coupling diffractive element may be further configured to diffract optical rays of the input optical beam, which are incident from another half space relative to the plane, to provide another diffracted optical beam substantially within the first and second surfaces such that at least a portion of the another diffracted optical beam is coupled only to another of the one or two out-coupling diffractive elements, wherein the further in-coupling diffractive element may be configured to diffract optical rays of the portion of the input optical beam, which are incident from the one half space relative to the plane, to provide a further another diffracted optical beam substantially within the further first and further second surfaces such that at least a portion of the further another diffracted optical beam is coupled only to another of the one or two further out-coupling diffractive elements which is opposite to the another of the one or more out-coupling diffractive elements, wherein the one and another of the one or more out-coupling diffractive elements may be configured to couple by diffraction parts of the one and another diffracted optical beams from the first substrate for providing two output optical beams out of the first substrate with the expanded exit pupil in one or two dimensions, the output optical beams being propagated through the second substrate, and the one and another of the further one or more diffractive elements may be configured to couple by diffraction parts of the further one and further another diffracted optical beams from the second substrate for providing two further output optical beams out of the second substrate with the expanded exit pupil in the one or two dimensions.

BRIEF DESCRIPTION OF THE DRAWINGS

For a better understanding of the nature and objects of the present invention, reference is made to the following detailed description taken in conjunction with the following drawings, in which:

FIGS. 4a-4d are graphs of simulated efficiencies of in-coupling diffraction gratings of FIG. 3 with 50 degrees slanted angle in corresponding left and right regions as a function of a incidence angle, according to an embodiment of the present invention;

FIGS. 5a and 5b are schematic representations (cross sectional views) demonstrating improving of out-coupling efficiency of a non-symmetric exit-pupil expander designed according to an embodiment of the present invention as shown in FIG. 5b compared to out-coupling efficiency of a symmetric exit-pupil expander shown in FIG. 5a;

MODES FOR CARRYING OUT THE INVENTION

Figure 1A:
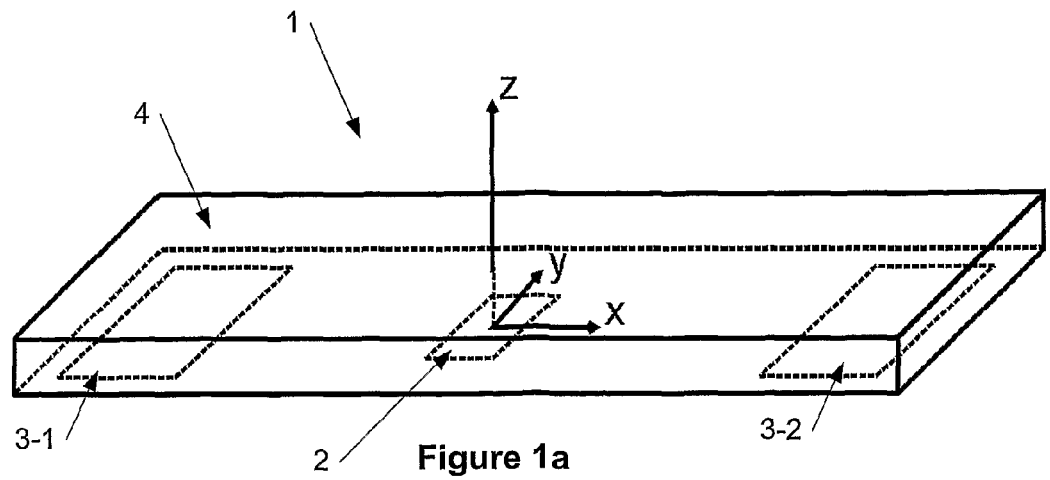
FIGS. 1a and 1b are schematic representations of a symmetric exit pupil expander in a Near-to-Eye Display (NED): a general 3-dimensional view is shown in FIG. 1a, and a cross sectional view demonstrating propagation of optical rays of the input optical beams from left and right half space is shown in FIG. 1b.

A new method and apparatus are presented for providing a wide field-of-view as well as for improving illumination uniformity in Exit Pupil Expanders (EPE) using stacked EPE substrates (or plates) with non-symmetric exit pupil expansion that use a plurality of diffractive elements for expanding the exit pupil of a display for viewing. The embodiments of the present invention can be applied to a broad optical spectral range of optical beams but most importantly to a visible part of the optical spectrum where the optical beams are called light beams. It is further noted that for describing various embodiments of the present invention the term "substrate" can be interpreted as a thin plate with two flat or non-flat surfaces (e.g., first and second surfaces) parallel and opposite to each other. All examples for different embodiments of the present invention provided herein are for flat substrates but in principle these embodiments can be applied to non-flat stacked EPE substrates as well.

Various embodiments of the present invention enable to increase field of view without the need for high refractive index materials. Alternatively, the embodiments of the present invention enable reduction of the refractive index requirement to reach a given FOV as compared with traditional symmetric EPE plate. This would allow utilization of readily available materials with lower price and improved optical/environmental characteristics as compared with more exotic substrate materials such as MGC171 (manufactured by MITSUBISHI GAS CHEMICALS) with the refractive index of 1.71. Furthermore, improvement of the illumination uniformity of the virtual display can be also achieved using embodiments of the present invention.

According to an embodiment of the present invention, an optical device (e.g., the optical device can be a part of a virtual reality display) such as an exit pupil expander can comprise two (or more) substrates of optical material. We consider first a non-symmetric EPE comprising two substrates, wherein a first substrate has a first surface and a second surface (opposite to the first surface) and a second substrate has a further first surface and a further second surface (opposite to the further first surface) and being positioned substantially parallel to the first substrate and in juxtaposed spaced relationship hereto.

Moreover, the input optical beam emanated from an object or a virtual object (e.g., a virtual image of a display or a microdisplay) can be received by an in-coupling diffractive element disposed on the first or the second surface of the first substrate. Then optical rays of the input optical beam, which are incident from one half space relative to a plane perpendicular to the first substrate and parallel to periodic lines of the in-coupling diffractive element (e.g., diffraction grating), can be diffracted by the in-coupling diffractive element to provide one diffracted optical beam substantially within the first and second surfaces of the first substrate such that at least a portion of the one diffracted optical beam is coupled (e.g., using total internal reflection in the first substrate and optionally using an intermediate diffraction grating for two-dimensional expansion) only to one of one or more out-coupling diffractive elements (e.g., one out-coupling diffractive element for a monocular viewing, two out-coupling diffractive element for a binocular viewing, etc.) disposed on the first or the second surface; and optical rays of the input optical beam, which are incident from another half space relative to said plane, can be further diffracted to provide another diffracted optical beam substantially within the first and second surfaces such that at least a portion of said another diffracted optical beam is coupled (e.g., using total internal reflection in the first substrate and optionally using another intermediate diffraction grating) only to another (the binocular viewing is considered in this example) of the one or more out-coupling diffractive elements. Then parts of said one and another diffracted optical beams can be coupled by diffraction from the first substrate using the one or more out-coupling diffractive elements for providing two output optical beams out of the first substrate with an expanded exit pupil in one or two dimensions (two-dimension expansion is provided by using intermediate diffraction gratings), and propagating said output optical beams through the second substrate to viewer eyes.

Furthermore, a portion of the original input optical beam from the object or the virtual object (e.g., the virtual image of the display or the microdisplay), which propagates through said first substrate (e.g., without changing a direction) into the second substrate, can be received by a further in-coupling diffractive element disposed on the further first or further second surface of the second substrate and substantially in alignment with the in-coupling diffractive element of the first substrate and having further periodic lines parallel to the periodic lines of the in-coupling diffractive element. Then optical rays of the portion of the input optical beam, which are incident from the one half space relative to said plane, can be diffracted by the further in-coupling diffractive element to provide a further one diffracted optical beam substantially within said further first and further second surfaces such that at least a portion of said further one diffracted optical beam is coupled (e.g., using the total internal reflection in the second substrate and optionally a further intermediate diffraction grating) only to one of one or more further out-coupling diffractive elements (e.g., one further out-coupling diffractive element for a monocular viewing, two further out-coupling diffractive element for a binocular viewing, etc.) which is opposite to said another of the one or more out-coupling diffractive elements of the first substrate, and optical rays of the portion of the input optical beam, which are incident from the another half space relative to said plane, can be diffracted using the further in-coupling diffractive element to provide a further another diffracted optical beam substantially within the further first and further second surfaces of the second substrate such that at least a portion of the further another diffracted optical beam is coupled (e.g., using total internal reflection in the second substrate and optionally another further intermediate diffraction grating) only to another (the binocular viewing is considered in this example, as stated herein) of the one or more further out-coupling diffractive elements which is opposite to said one of the one or more out-coupling diffractive elements of the first substrate. Then parts of said further one and further another diffracted optical beams from the second substrate can be coupled using the one or more further out-coupling diffractive elements for providing two further output optical beams out of the second substrate with the expanded exit pupil in the one or two dimensions (two-dimension expansion is provided by using intermediate diffraction gratings) directly to the viewer eyes.

Figure 1B:
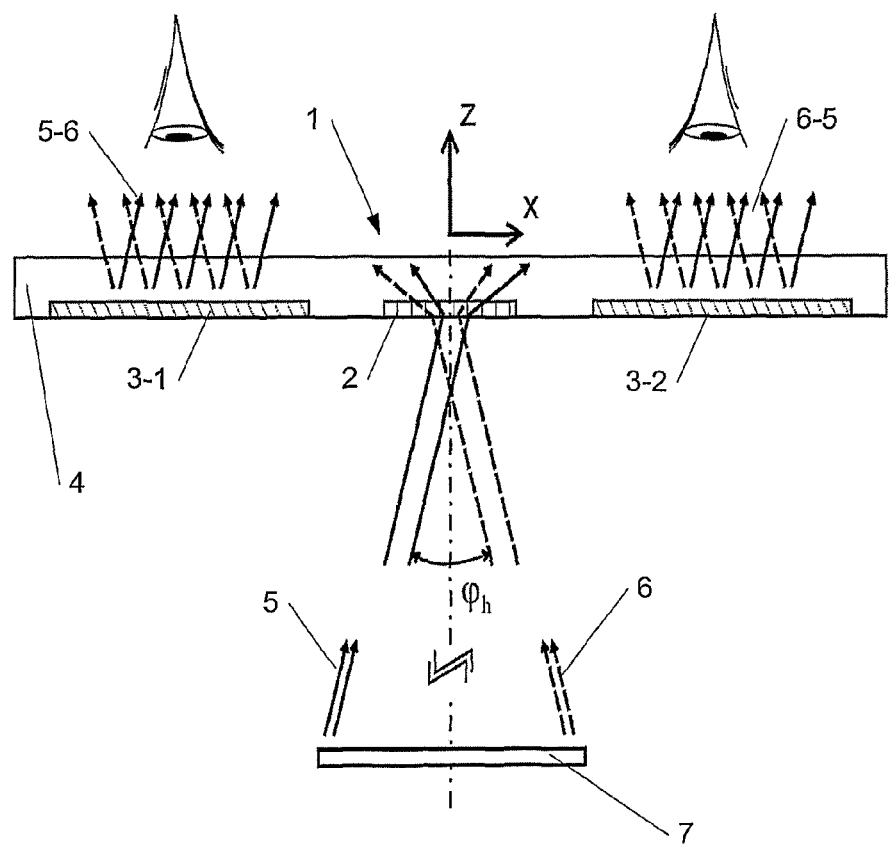
Figure 2:
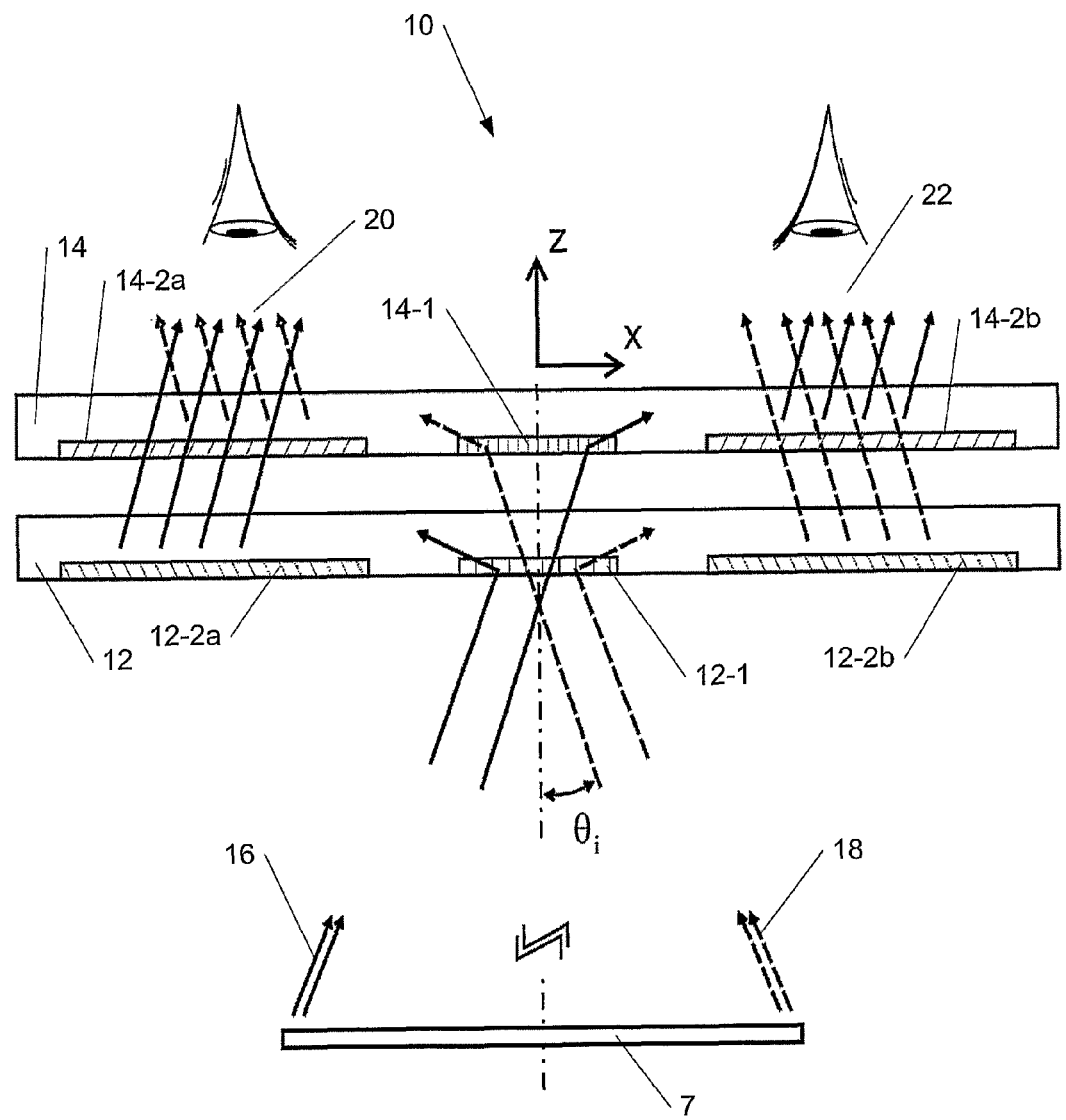
FIG. 2 is a cross-sectional view of a non-symmetric exit pupil expander demonstrating propagation of optical rays of the input optical beams from left and from right half space, according to an embodiment of the present invention.

It is noticed that in the scenario described above, each of the two output optical beams and a corresponding each of the two further output optical beams can substantially coincide at a predetermined distance range from the second substrate, thus providing an image to both viewer eyes with a wide field-of-view compared to a one-substrate case (see discussion in regard to FIGS. 1 and 2).

Also as known in the art for EPE for the flat substrates, typically optical rays of the output optical beams and of the further output optical beams are substantially parallel to corresponding optical rays of the input optical beam.

It is further noticed that the virtual display can be monocular or binocular, therefore the scenario described herein can be used for both monocular and binocular viewing. Also, according to a further embodiment of the present invention, the EPE with stacked substrates can be designed only for monocular viewing with one out-coupling grating element in each substrate, wherein these out-coupling grating elements can be substantially opposite to each other and located in the same half sphere relative to a plane perpendicular to the substrates and parallel to periodic lines of the in-coupling diffractive elements.

According to a further embodiment, wherein, when using identical materials and identical surrounding material for the first and second substrates, the in-coupling diffractive element of the first substrate can have a period of the periodic lines equal to a maximum wavelength (or alternatively equal to a minimum wavelength) of the input optical beam divided by an index of refraction of the first and second substrates (alternatively by an index of refraction of a surrounding material of the first and second substrates), and the further in-coupling diffractive element of the second substrate can have a further period of the further periodic lines equal to a minimum wavelength (alternatively equal to a minimum wavelength) of the input optical beam divided by an index of refraction of a surrounding material of the first and second substrates (or alternatively by an index of refraction of the first and second substrates). The surrounding material of the first or the second substrate can be air with index of refraction of 1.

Moreover, if two out-coupling diffractive elements are used in each substrate, typically the two out-coupling diffractive elements can be symmetrical relative to the in-coupling diffractive element in each substrate. Also, the out-coupling diffractive elements and the in-coupling diffractive elements in each substrate can have parallel periodic lines.

There are many further possible variations. For example, distances from the one or more out-coupling diffractive elements to the in-coupling diffraction element in the first substrate may be the same as or different from (see discussions in reference to FIGS. 5a and 5b) the distances from the corresponding one or more further out-coupling diffractive elements to the further in-coupling diffractive element in the second substrate in order to provide better efficiency and uniformity.

Also, a width of the in-coupling diffraction element of the first substrate in a direction perpendicular to the periodic lines may be different from a corresponding width of the further in-coupling diffractive element of the second substrate in a direction perpendicular to the further periodic lines to provide better coupling efficiency (see discussions in reference to FIG. 5c).

Figure 7A:
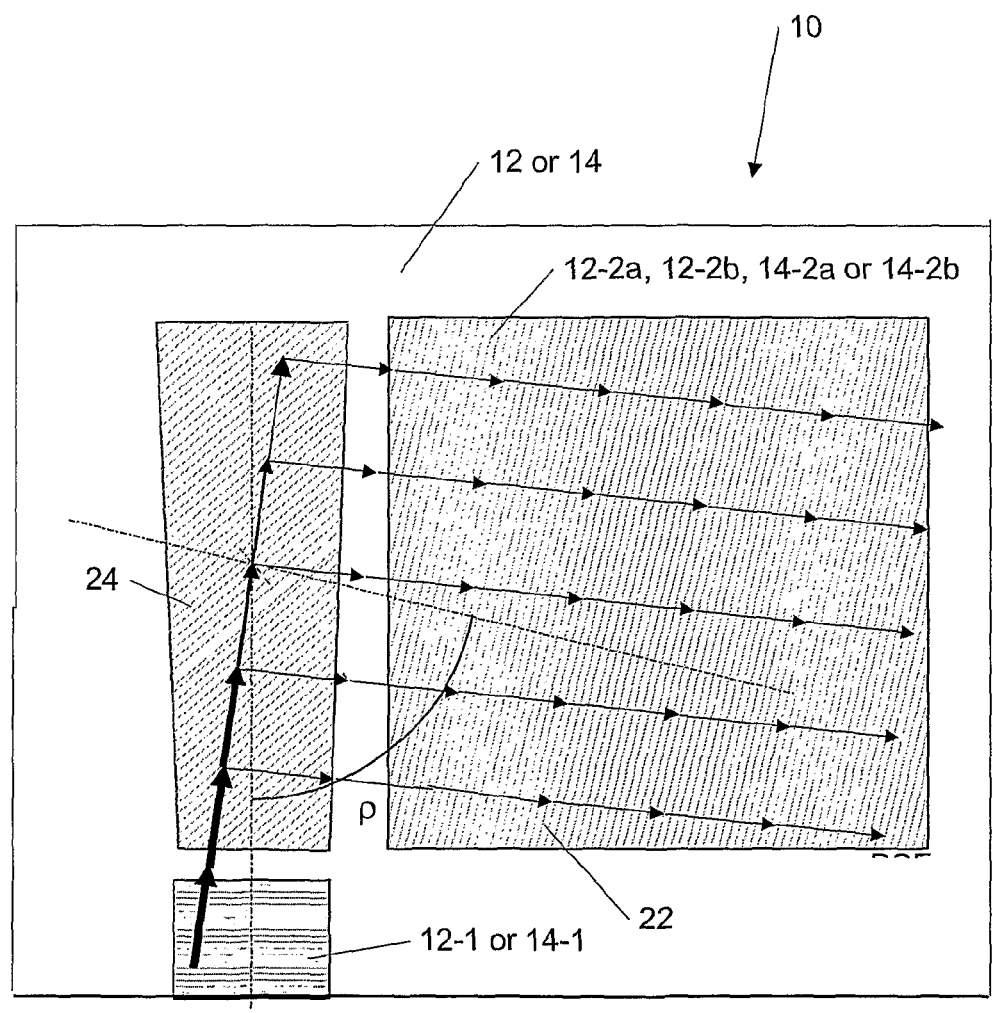
FIGS. 7a and 7b are schematic representations (top views) of one area (left or right) of a two-dimensional diffractive exit pupil expander, wherein an intermediate diffractive element (grating) has an odd number of first order diffractions (shown in FIG. 7a) or an even number of further first order reflections (shown in FIG. 7b), according to embodiments of the present invention.
Figure 7B:
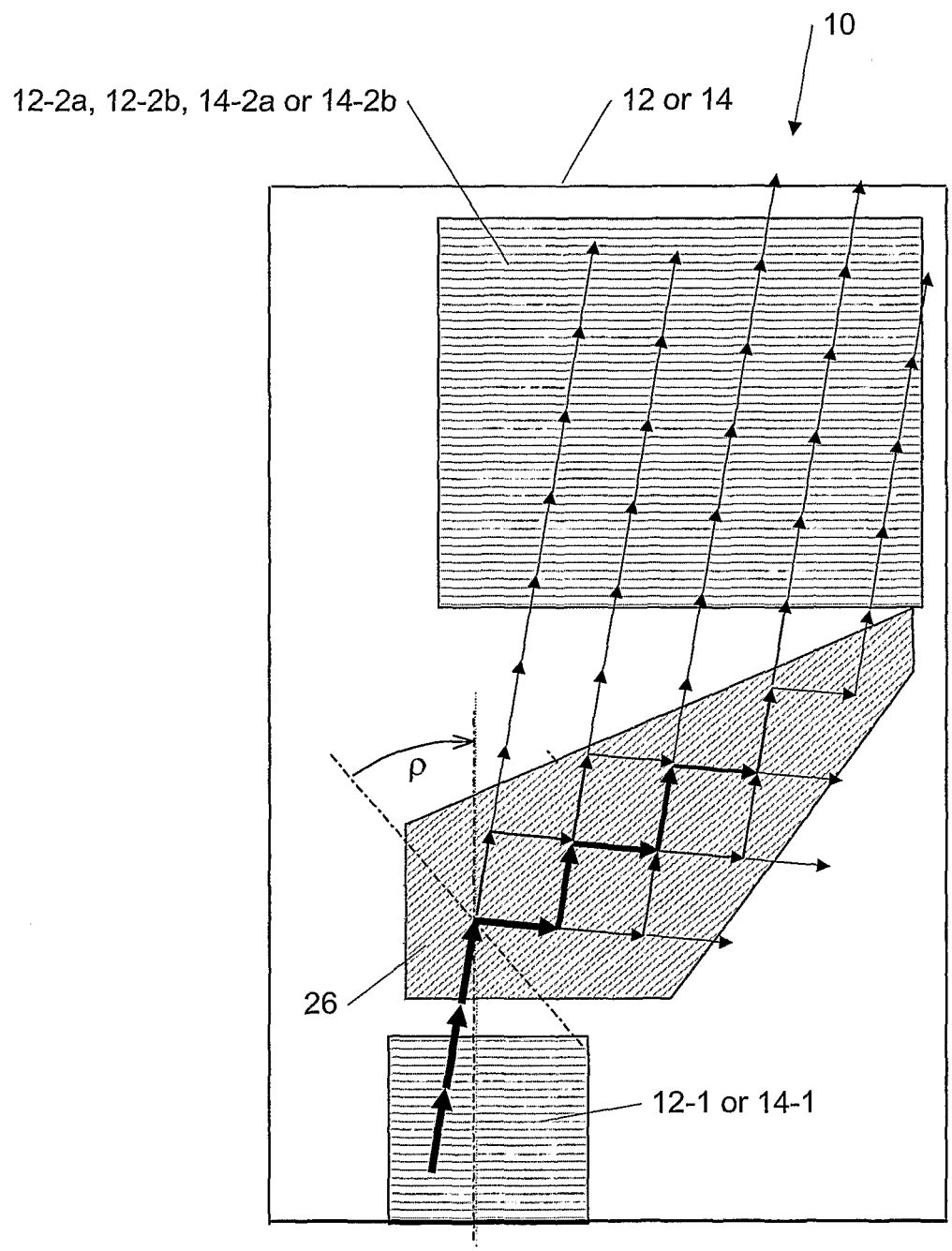

According to further embodiments, the two-dimensional expansion can be provided by using one or more intermediate diffractive elements disposed on the first substrate and one or more further intermediate diffractive elements disposed on the second substrate such that at least parts of the input optical beam diffracted in the in-coupling diffractive element and in the further in-coupling diffractive element are first coupled to corresponding the one or more intermediate diffractive elements and the one or more further intermediate diffractive elements, which can be configured to further couple by diffraction corresponding optical beams to the one or more out-coupling diffractive elements and to the one or more further out-coupling diffractive elements, respectively, for providing the one or more output optical beams and one or more further output optical beams with the expanded exit pupil in two dimensions (see further discussions in reference to FIGS. 7a and 7b). The intermediate diffractive element can have an odd number of first order diffractions or an even number of further first order reflections as known in the art and, e.g., described by T. Levola in "Diffractive Optics for Virtual Reality Displays", SID Eurodisplay 05, Edinburg (2005), SID 02 Digest, Paper 22.1.

According to embodiments of the present invention, the in-coupling diffractive elements (or the in-coupling diffraction gratings) can be implemented using a variety of different types of diffraction gratings, e.g., planar diffraction gratings manufactured using lithographic methods or classically ruled (having different groove angles and profiles, such as binary, triangular, sinusoidal, etc.). The diffractive elements (i.e., their grooves) can be symmetric or asymmetric, e.g., using slanted gratings for increasing the coupling efficiency and reducing an "optical crosstalk" between left and right half spaces. For example, the slanted gratings can be asymmetric such that their slanting angles are equal but have opposite signs relative to the optical axis of the input optical beam, i.e., the groove shapes are mirror images of each other. Thus, grooves of the in-coupling diffractive element or the further in-coupling diffractive element can have an asymmetric groove shape and implemented, e.g., as slanted diffraction gratings (see further discussions in reference to FIGS. 3 and 4).

Furthermore, the EPE device can further comprise one or more further substrates, positioned substantially parallel to the first and second substrates, described herein, and in juxtaposed spaced relationship thereto, with in-coupling and out-coupling diffraction elements disposed on respective surfaces of the one or more further substrates, wherein each of the one or more further substrates with the disposed diffractive elements is substantially identical to the first substrate with the in-coupling diffractive element and the one or more out-coupling diffraction elements or to the second substrate with the further in-coupling diffractive element and the one or more further out-coupling diffraction elements.

As previously stated, the examples for different embodiments of the present invention provided herein are primarily for the flat substrates but in principle these embodiments can be applied to non-flat stacked EPE substrates as well. The non-flat substrates can be cylindrical (e.g., see PCT patent application, International Publication Number WO2006064301), spherical or aspheric as described in co-pending PCT application filed on the same date, International Publication Number WO2009077803 (PCT/IB2007/003965). Also the term "aspheric" can be broadly defined as a surface with a profile that is neither a portion of a sphere nor of a circular cylinder and it is not flat and can be described by complex equations, wherein simple examples can include but are not limited to parabola, hyperbola, ellipse, etc.

FIGS. 1a and 1b shows an example of a schematic representations of a symmetric exit pupil expander (EPE) 1 in a Near-to-Eye Display (NED) application: a general 3-dimentional view is shown in FIG. 1a, and a cross sectional view demonstrating propagation of optical rays of the input optical beams from left and right half space is shown in FIG. 1b. Input optical rays 5 and 6 emanated from a virtual image of a display (e.g., a microdisplay) 7 are coupled into a planar light guide plate (substrate) 4 using a diffraction grating 2. The in-coupled rays propagate inside the light guide plate by a way of total internal reflection (TIR). Pupil expansion for the input image is achieved using a second diffraction gratings 3-1 and 3-2 that couple out parts of the coupled (trapped) light as output beams 5-6 and 6-5 to provide an image of the microdisplay 7. For proper viewing conditions the whole Field-of-View (FOV) spanned by the input optical rays ($\phi_h$ is an incidence angle) must be coupled into the light guide plate by the in-coupling grating. Moreover, the whole FOV must be provided for both eyes, i.e., to left and right branches of the EPE 1. This means that the input optical rays 6 incident from the right half space must be coupled to both the left and right eyes of the viewer, and the same must hold for the input optical rays 5 incident from the left half space. For imaging purposes it is advantageous to limit the in-coupling grating to support only first diffraction orders (m=±1). For the coordinate system given in FIGS. 1a and 1b, the light diffracted to the m=+1 diffraction order is coupled to the left branch of the EPE plate and the light diffracted to the m=−1 diffraction order is coupled to the right branch, respectively. Proper light in-coupling is achieved when the following two conditions are met. First, the incidence angle of the in-coupled light with respect to a plane normal of the light guide plate must be large enough to support TIR. The incidence angle can be increased by reducing the grating period of the in-coupling grating. Second, the grating period of the in-coupling grating must support first order diffraction, i.e., m=±1 diffraction orders (but not higher diffraction orders) must exist for incidence angles within the whole FOV. This will limit the minimum grating period that can be used for given a material. By combining the two conditions it can be shown that the horizontal FOV limit for given materials and polychromatic light is given by Equation 1.

The approach discussed in reference to FIGS. 1a and 1b for symmetric exit pupil expander can be used for comparison with the case of non-symmetric exit pupil expander with stacked EPE substrate designed according to various embodiments of the present invention.

FIG. 2 shows one example among others of a cross-sectional view of a non-symmetric exit pupil expander 10 for demonstrating propagation of optical rays 16 and 18 of the input optical beams from the left and right half spaces, according to an embodiment of the present invention.

The operation of the non-symmetric EPE can be understood by considering the light in-coupling for rays that propagate along xz-plane, i.e., horizontal rays. The grating period for in-coupling and out-coupling areas of the first EPE plate can be selected so that light from the right half space ($\theta_i$ is an incidence angle) is coupled to the left eye of the viewer and the light from the left half space is coupled to the right eye. The grating periods of the second EPE plate can be selected so that couplings are reversed.

For example, the grating period of the in-coupling grating 12-1 on the first EPE substrate (plate) 12 can be selected so that m=−1 diffraction order can exist only for optical rays 18 incident from the right half space and m=+1 diffraction order can exist only for optical rays 16 incident from the left half space. This means that optical rays 18 incident from the right half space can be coupled only to the right branch of the first EPE substrate 12. Similarly, optical rays 16 incident from the left half space can be coupled only to the left branch of the first EPE plate 12. For polychromatic illumination this can be achieved if the grating period of the in-coupling grating 12-1 of the first EPE substrate 12 is selected as $$d_1 = \frac{\lambda_{max}}{n_2}, \quad (2)$$

wherein $\lambda_{max}$ is a maximum wavelength of the polychromatic incident light and $n_2$ is the refractive index of the EPE substrates 12 and 14 (assuming that these substrates are made from the same material).

Moreover, the grating period of the in-coupling grating on the second EPE substrate 14 can be selected such that m=+1 diffraction order can exist only for optical rays 18 incident from the right half space and m=−1 diffraction order exist only for optical rays 16 incident from the left half space. This means that optical rays 18 incident from the right half space can be coupled only to the left branch of the second EPE substrate 14. Similarly, optical rays 16 incident from the left half space can be coupled only to the right branch of the EPE substrate 14. For polychromatic illumination this is achieved if the grating period of the in-coupling diffraction grating 14-1 of the second EPE substrate 14 is selected as $$d_2 = \frac{\lambda_{min}}{n_1}, \quad (3)$$

wherein $\lambda_{min}$ is a minimum wavelength of the polychromatic incident light and $n_1$ is the refractive index of surrounding material (e.g., equal to 1 for air) of the EPE substrates 12 and 14 (assuming that these substrates have the same surrounding material).

Thus, the viewer can see an output optical beams 20 and 22 coupled by corresponding out-coupling diffraction gratings 12-2a and 12-2b from the first EPE substrate 12 and coupled by corresponding out-coupling diffraction gratings 14-2a and 14-2b from the second EPE substrate 14. The FOV of the input optical beam that can be observed through the EPE 10 can be determined by considering the combined criteria for the existence of the diffraction orders as explained above and existence of the TIR inside the plates. This results for the horizontal FOV of the stacked non-symmetric EPE discussed herein can be expresses as follows:

$$w_\lambda = \min\left(\frac{n_2\lambda_{min} - n_1\lambda_{max}}{n_1\lambda_{max}}, \frac{n_2\lambda_{min} - n_1\lambda_{max}}{n_1\lambda_{min}}\right) \quad (4)$$
$$= \frac{n_2\lambda_{min} - n_1\lambda_{max}}{n_1\lambda_{max}}.$$

Equation 4 shows that the non-symmetric EPE enables FOV improvement with respect to the symmetric case (see Equation 1 and FIGS. 1a and 1b) by a factor of $$M_{FOV} = \frac{\lambda_{max} + \lambda_{min}}{\lambda_{max}} \quad (5)$$

This results is an improvement by a factor of 1.69 for the visible spectra ($\lambda_{min}$=450 nm and $\lambda_{max}$=650 nm) for the stacked non-symmetric EPE. For a narrow wavelength band, e.g. $\lambda_{max}$−$\lambda_{min}$=10 nm, FOV improvement by factor approaching 2 can be obtained.

It is further noted that the order of EPE substrates 12 and 14 can be reversed according to another embodiment of the present invention, as stated herein.

Moreover, a further improvement of the FOV may be obtained by using additional one or more EPE plates or one or more EPE plate pairs designed to operate at larger complementary incidence angles outside of the angular acceptance range of the original non-symmetric EPE plates or EPE plate pairs.

It is further noted that in general the EPE stack need not be an even combination of the EPE plates: for example it could an even or odd number of plates including, e.g., one or more symmetric EPE plates and two or more non-symmetric EPE plates (e.g., on or more EPE pairs) operating at incidence angles outside (i.e., larger than) the angular acceptance range of the one or more symmetric EPE plates.

Figure 3:
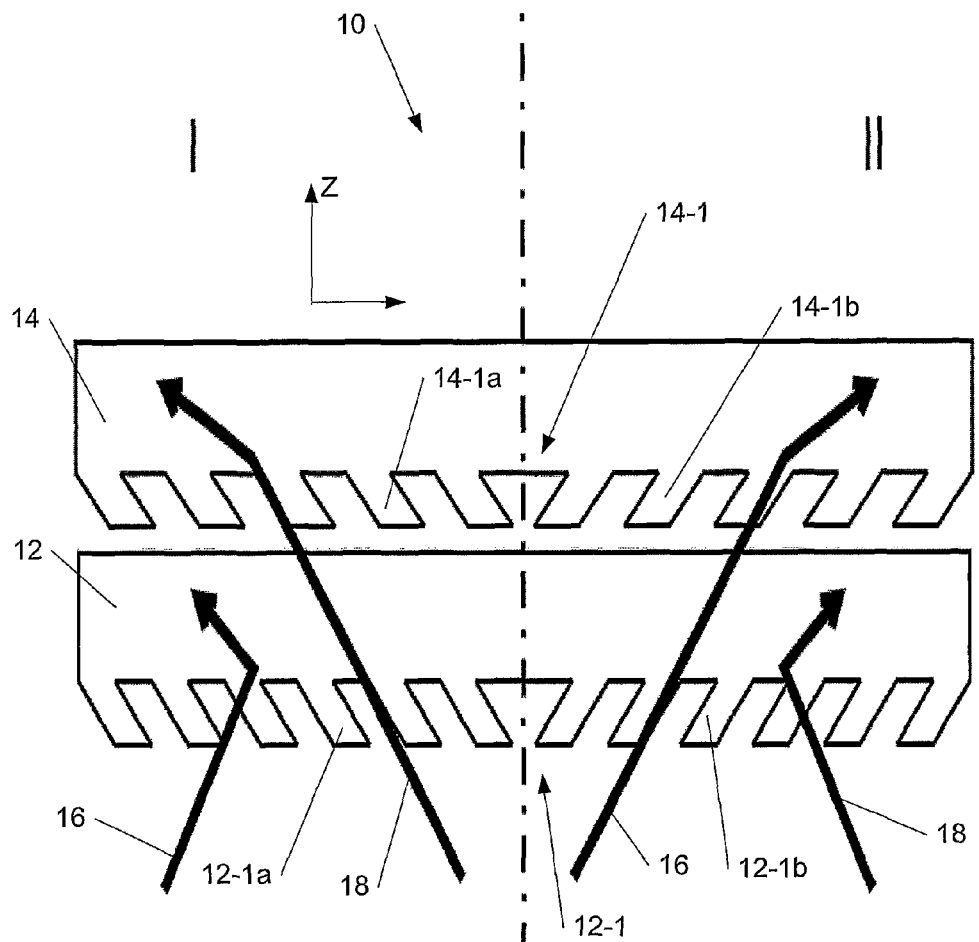
FIG. 3 is a schematic representation (cross-sectional view) demonstrating a geometry of in-coupling diffractive elements (diffraction gratings) implemented as slanted asymmetric gratings, according to an embodiment of the present invention.
Figure 4A:
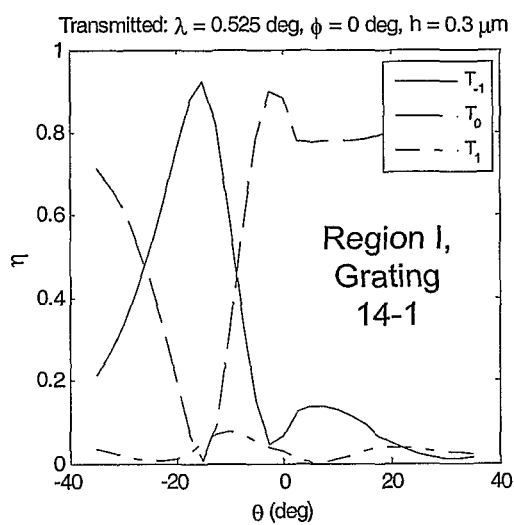
Figure 4B:
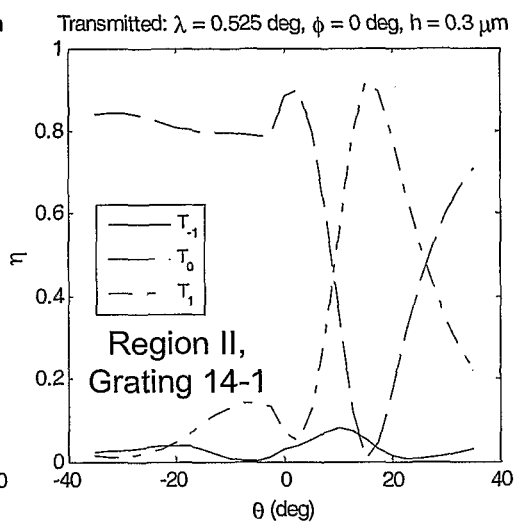

FIG. 3 shows one example among others of a schematic representation (cross-sectional view) demonstrating a geometry of in-coupling diffractive elements (diffraction gratings) 12-1 and 14-1 implemented as asymmetric slanted asymmetric gratings with 50 degrees slanting angle, according to an embodiment of the present invention. The grating, optical rays and substrate numbers correspond to the reference numbers of corresponding components shown in FIG. 2. Grooves of the in-coupling diffractive elements 12-1 and 14-1 have grooves with an asymmetric groove shape: 12-1a and 14-1a on the left in region 1 and 12-1b and 14-1b on the right in region II, respectively.

FIGS. 4a-4d shows an example among others of graphs of simulated (using Rigorous Fourier Modal Method for multilayer surface relief gratings) efficiencies ρ of the in-coupling slanted diffraction gratings 12-1 and 14-1 shown in FIG. 3 with 50 degrees slanted angle in corresponding left and right regions (indicated in FIG. 3) as a function of the incidence angle θ as defined herein, according to embodiments of the present invention. In FIGS. 4a-4d: φ is the angle between the x axis (shown in FIGS. 1-3) and the projection of the incident direction vector, k̂, of the input optical beam on the grating surface. Parameters of gratings 12-1 and 14-1 are the following: EPE refractive index n=1.71, surrounding material n=1, wavelength λ=525 nm, angle φ=0 degrees, polarization of light TM, grating period d=312 nm (for the grating 12-1), d=525 nm (for the grating 14-1), grating height 300 nm, fill factor f=0.5 and slanting angle±50 degrees (region II/I).

Figure 5A:
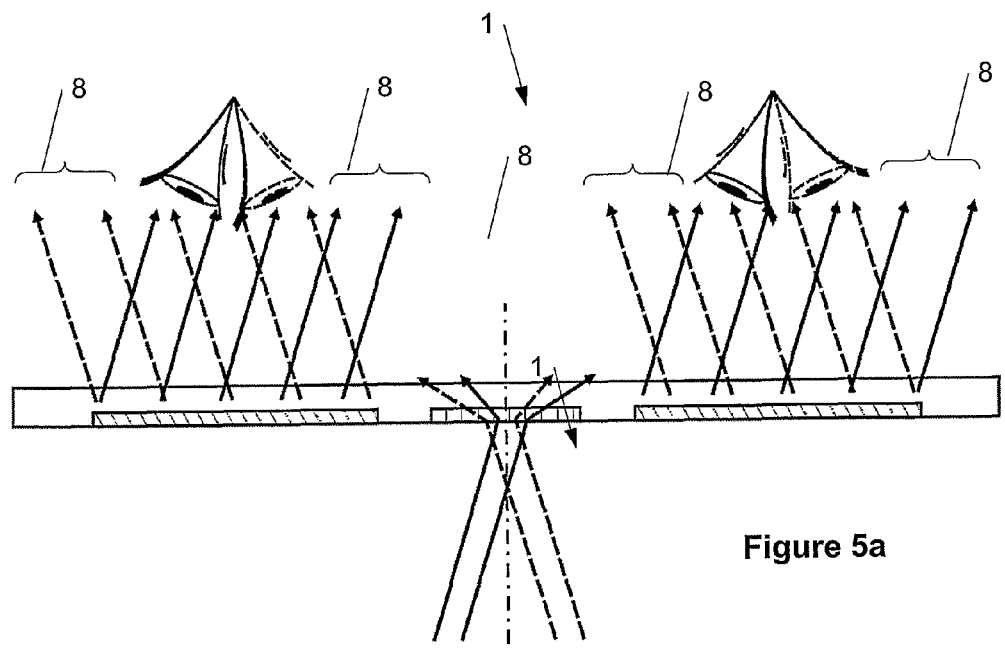
Figure 5B:
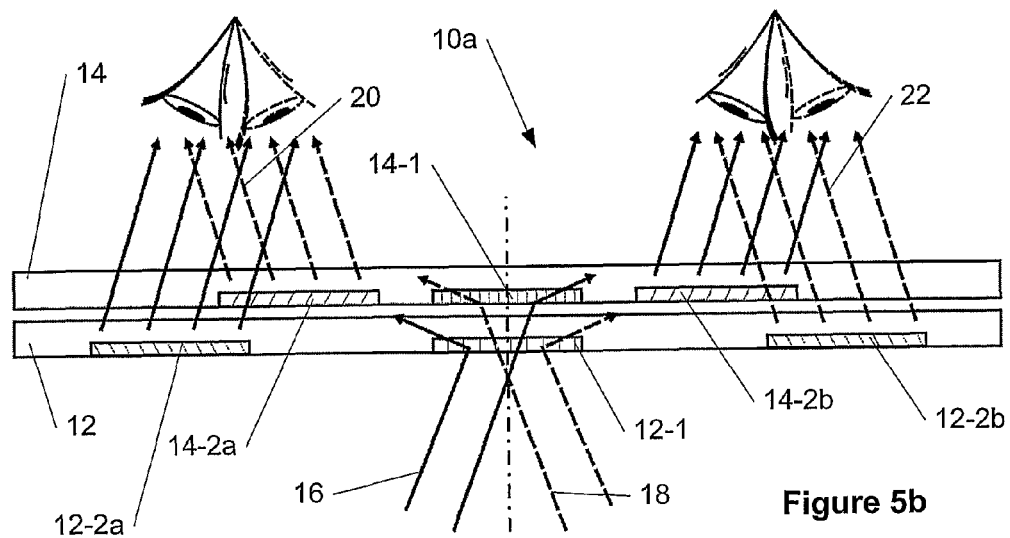

FIGS. 5a and 5b show examples among others of schematic representations (cross sectional views) demonstrating improving of out-coupling efficiency of a non-symmetric exit-pupil expander designed according to an embodiment of the present invention as shown in FIG. 5b compared to out-coupling efficiency of a symmetric exit-pupil expander shown in FIG. 5a. The grating, optical rays and substrate numbers correspond to the reference numbers of corresponding components shown in FIGS. 1a, 1b and 2, respectively.

In a symmetric case shown in FIG. 5a, out-coupling gratings (exit pupil size) must span the whole FOV and thus cover the whole eye movement range, wherein areas 8 represent "wasted" light. In non-symmetric case shown in FIG. 5b, according to an embodiment of the present invention, size of out-coupling gratings for each plate needs to span only half FOV and, thus, only half of the eye movement range. This allows for optimum positioning of the out-coupling areas to reduce the amount of "wasted" light. Also in addition to the FOV increase, the non-symmetric expander can be utilized to improve the illumination uniformity of the EPE. As shown in FIG. 5b, the positioning of the out-coupling gratings 12-2a, 12-2b, 14-2a and 14-2b can be optimized separately for each half space with respect to left/right eye position. This enables improvement in the left/right eye illumination symmetry, illumination uniformity and reduction of unwanted light losses as described herein.

Figure 6:
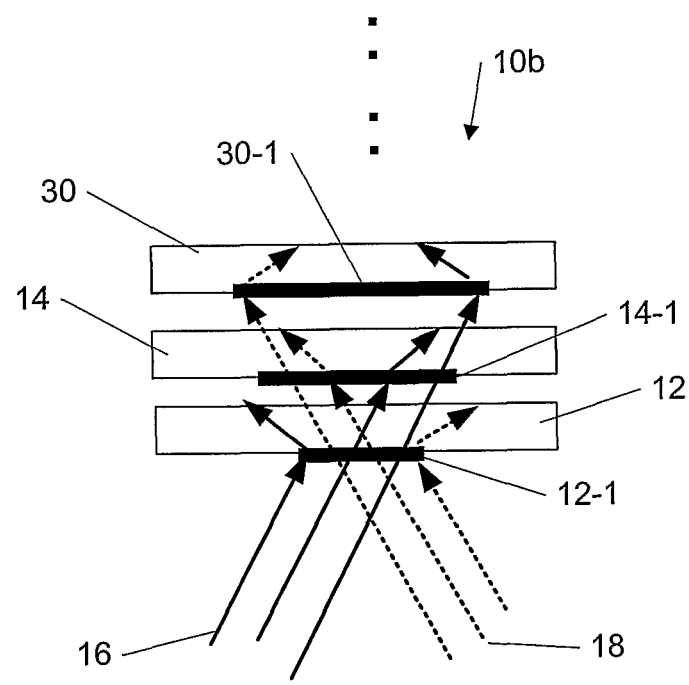
FIG. 6 is a schematic representation (cross sectional views) demonstrating improving of in-coupling efficiency of a non-symmetric exit-pupil expander having multiple stacked substrates, according to an embodiment of the present invention.

FIG. 6 shows an example among others of a schematic representation (cross sectional views) demonstrating improving of in-coupling efficiency of a non-symmetric exit-pupil expander having multiple stacked substrates (only in-coupling region is shown), according to an embodiment of the present invention. The grating, optical rays and substrate numbers correspond to the reference numbers of corresponding components shown in FIG. 2. FIG. 6 shows the case when one or more additional EPE substrates are added compared to the 2-substrate arrangement shown in FIGS. 2 and 3 (only substrate 30 with an in-coupling grating 30-1 is shown) to accommodate a broad wavelength band. As a practical example, if a pair of non-symmetric EPE plates with $n_2$=1.71 is used for blue (465 nm) and green (540 nm) wavelengths and a separate pair of non-symmetric EPE plates with $n_2$=1.71 is used for red (650 nm) wavelength, FOV value of about 60 degrees is reachable. Moreover, if a pair of non-symmetric EPE plates with $n_2$=1.71 is used for each of the RGB components using a stack of six plates, FOV value of about 74 degrees should be possible. In addition, FIG. 6 demonstrate that an improvement in coupling efficiency can be achieved by increasing the width of the in-coupling gratings 14-1 and 30-1 such that more light can be collected at the ends of the gratings 14-1 and 30-1.

FIGS. 7a and 7b show examples among others of schematic representations (top views) of one area (left or right) of a two-dimensional diffractive exit pupil expander according to embodiments of the present invention, wherein an intermediate diffractive element (grating) 24 or 26 has an odd number of first order diffractions (shown in FIG. 7a) or an even number of further first order reflections (shown in FIG. 7b), as described by T. Levola in "Diffractive Optics for Virtual Reality Displays", SID Eurodisplay 05, Edinburg (2005), SID 02 Digest, Paper 22.1. The angle ρ is a rotation angle between the periodic lines of the intermediate diffraction grating 26 and the in-coupling grating 12-1 or 14-1. respectively. The grating and substrate numbers in FIGS. 7a and 7b correspond to the reference numbers of corresponding components shown in FIG. 2.

Figure 8:
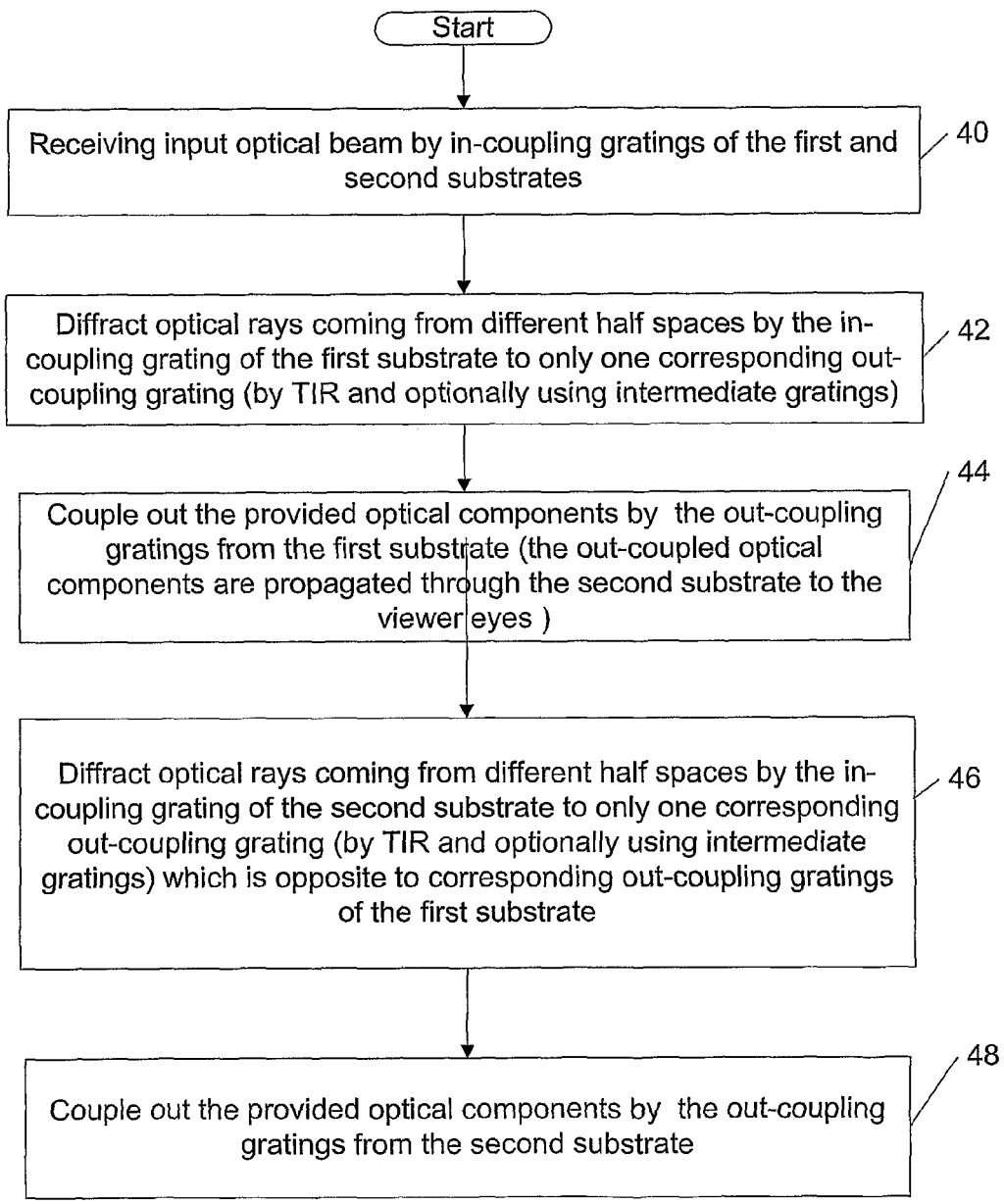
FIG. 8 is a flow chart demonstrating propagation of optical rays of the input optical beams from left and right half spaces of a non-symmetric exit pupil expander, according to an embodiment of the present invention.

FIG. 8 shows a flow chart demonstrating propagation of optical rays of the input optical beams from left and right half space of a non-symmetric exit pupil expander, according to an embodiment of the present invention.

The flow chart of FIG. 8 only represents one possible scenario among others. It is noted that the order of steps shown in FIG. 8 is not absolutely required, so in principle, the various steps can be performed out of order. In a method according to the embodiment of the present invention, in a first step 40, an input optical beam is received by in-coupling diffraction gratings of the first and second substrates.

In a next step 42, optical rays coming from different half spaces are diffracted by the in-coupling grating of the first substrate to only one corresponding out-coupling grating (by TIR in the first substrate and optionally using an intermediate grating in the first substrate for two-dimensional expansion). In a next step 44, the provided optical components are coupled out by the out-coupling diffraction gratings from the first substrate (the out-coupled optical components are propagated through the second substrate to the viewer eyes) thus providing two output optical beams out of the second substrate with the expanded exit pupil in the one or two dimensions.

In a next step 46, optical rays coming from different half spaces are diffracted by the in-coupling grating of the second substrate to only one corresponding out-coupling grating (by TIR in the second substrate and optionally using an intermediate grating in the second substrate for two-dimensional expansion) which is opposite to corresponding out-coupling gratings of the first substrate. In a next step 48, the provided optical components are coupled out by the out-coupling gratings from the second substrate to the viewer eyes, providing two further output optical beams out of the second substrate with the expanded exit pupil in the one or two dimensions.

Figure 9:
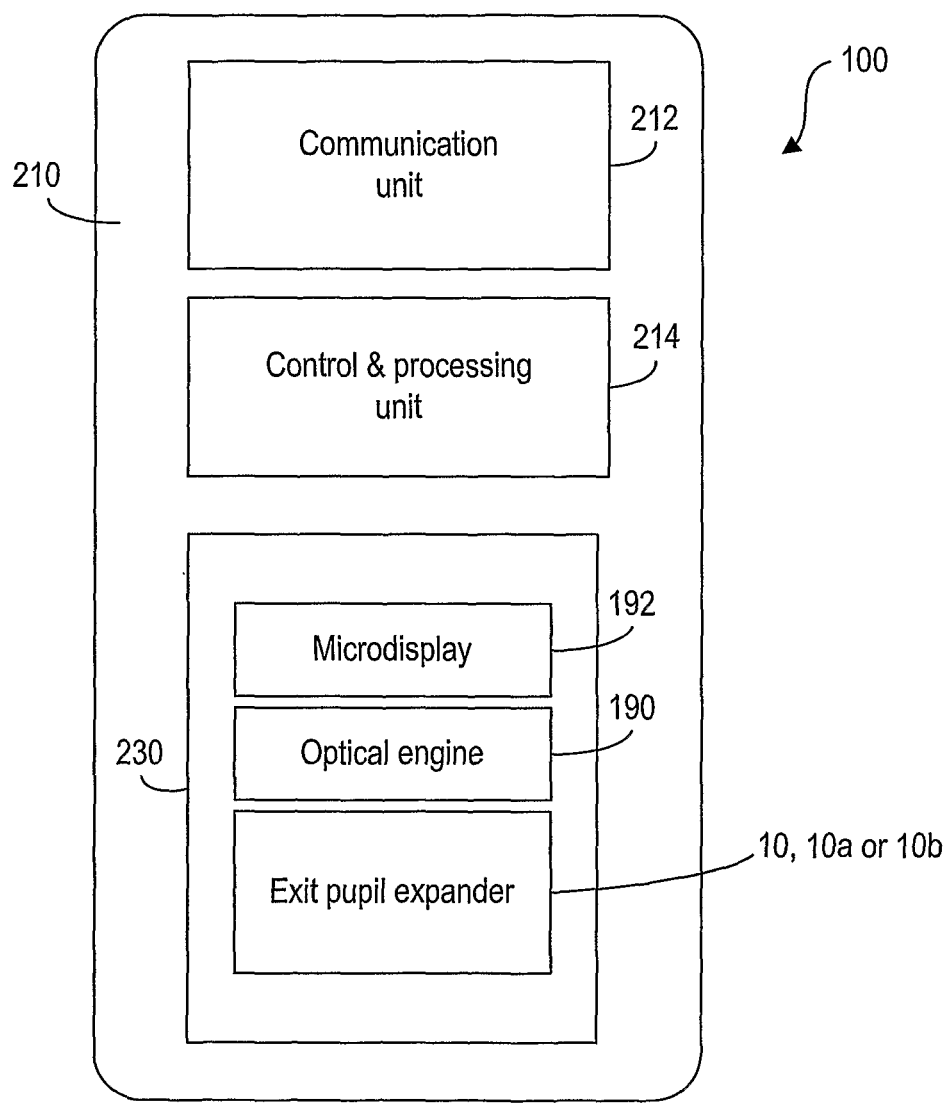
FIG. 9 is a schematic representation of an electronic device, having an exit pupil expander system, according to embodiments of the present invention.

FIG. 9 is a schematic representation of an electronic device, having an exit pupil expander system, according to embodiments of the present invention.

FIG. 9 shows an example of a schematic representation of an electronic device 100, having the exit pupil expander (EPE) system 10 (10a, or 10b) according to an embodiment of the present invention.

The exit pupil expander (EPE) 10, 10a or 10b can be used in an electronic (portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 9, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The EPE 10, according to the present invention, can be optically linked to an optical engine 190.

Furthermore, the image source 192, as depicted in FIG. 9, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, handheld computer, digital video and still camera, wearable computer, computer game device, specialized bring-to-the-eye product for viewing and other portable electronic devices. However, the exit pupil expander, according to an embodiment of the present invention, can also be used in a non-portable device, such as a gaming device, vending machine, band-o-matic, and home appliances, such as an oven, microwave oven and other appliances and other non-portable devices.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
a first substrate of optical material having a first surface and a second surface which is opposite to the first surface, wherein the first surface defines a first plane;
an in-coupling diffractive element disposed on the first or the second surface of said first substrate;
one or more out-coupling diffractive elements disposed on the first or the second surface,
wherein said in-coupling diffractive element is configured to diffract optical rays of the input optical beam, which are incident from one half space relative to a second plane perpendicular to said first plane and parallel to periodic lines of the in-coupling diffractive element, so as to provide one diffracted optical beam substantially within said first and second surfaces such that at least a portion of said one diffracted optical beam is coupled only to one of said one or more out-coupling diffractive elements;
a second substrate of optical material having a further first surface and a further second surface and being positioned substantially parallel to the first substrate and in juxtaposed spaced relationship hereto, wherein the further second surface is opposite to the further first surface;
a further in-coupling diffractive element disposed on the further first or the further second surface substantially in alignment with said in-coupling diffractive element and having further periodic lines parallel to said periodic lines of the in-coupling diffractive element, and configured to receive a portion of said input optical beam which propagates through said first substrate into the further substrate; and
one or more further out-coupling diffractive elements disposed on the further first or the further second surface and each being substantially opposite to a corresponding diffractive element of said one or more out-coupling diffractive elements,
wherein said further in-coupling diffractive element is configured to diffract optical rays of the portion of the input optical beam, which are incident from the other half space relative to said second plane, to provide a further one diffracted optical beam substantially within said further first and further second surfaces such that at least a portion of said further diffracted optical beam is coupled only to one of said one or more further out-coupling diffractive elements which is opposite to said only one of the one or more out-coupling diffractive elements to which the one diffracted optical beam is coupled,
and wherein said one of the one or more out-coupling diffractive elements is configured to couple by diffraction parts of said one diffracted optical beam from the first substrate for providing an output optical beam out of said first substrate with an expanded exit pupil in one or two dimensions, said output optical beam being propagated through said second substrate, and
said one of the one or more further out-coupling diffractive elements is configured to couple by diffraction parts of said further one diffracted optical beams from the second substrate for providing a further output optical beam out of said second substrate with said expanded exit pupil in said one or two dimensions.

2. The apparatus of claim 1, wherein said in-coupling diffractive element is further configured to diffract optical rays of the input optical beam, which are incident from said other half space relative to said second plane, to provide another diffracted optical beam substantially within said first and second surfaces such that at least a portion of said another diffracted optical beam is coupled only to another of said one or two out-coupling diffractive elements,
wherein said further in-coupling diffractive element is configured to diffract optical rays of said portion of the input optical beam, which are incident from said one half space relative to said second plane, to provide a further another diffracted optical beam substantially within said further first and further second surfaces such that at least a portion of said further another diffracted optical beam is coupled only to another of said one or two further out-coupling diffractive elements which is opposite to said another of the one or more out-coupling diffractive elements,
wherein said one and another of the one or more out-coupling diffractive elements are configured to couple by diffraction parts of said one and another diffracted optical beams from the first substrate for providing two output optical beams out of said first substrate with the expanded exit pupil in one or two dimensions, said output optical beams being propagated through said second substrate, and
said one and another of the further one or more diffractive elements are configured to couple by diffraction parts of said further one and further another diffracted optical beams from the second substrate for providing two further output optical beams out of said second substrate with the expanded exit pupil in said one or two dimensions.

3. The apparatus of claim 2, wherein each of said two output optical beams and a corresponding each of said two further output optical beams substantially coincide at a predetermined distance range from the second substrate.

4. The apparatus of claim 2, wherein the one and another of said one or more out-coupling diffractive elements are symmetrical relative to the in-coupling diffractive element and the one and another of the one or more further out-coupling diffractive elements are symmetrical relative to the further in-coupling diffractive element.

5. The apparatus of claim 2, wherein distances from the one and another of said one or more out-coupling diffractive elements to the in-coupling diffraction element are different than corresponding distances from the one and another of the one or more further out-coupling diffractive elements to the further in-coupling diffractive element.

6. The apparatus of claim 1, wherein optical rays of the output optical beam and of the further output optical beam are substantially parallel to corresponding optical rays of the input optical beam.

7. The apparatus of claim 1, wherein, when using identical materials and identical surrounding material for the first and second substrates, the in-coupling diffractive element has a period of the periodic lines equal to a maximum wavelength of the input optical beam divided by an index of refraction of the first and second substrates, and the further in-coupling diffractive element has a further period of the further periodic lines equal to a minimum wavelength of the input optical beam divided by an index of refraction of a surrounding material of the first and second substrates.

8. The apparatus of claim 1, wherein, when using identical materials and identical surrounding material for the first and second substrates, the further in-coupling diffractive element has a further period of the further periodic lines equal to a maximum wavelength of the input optical beam divided by an index of refraction of the first and second substrates, and the in-coupling diffractive element has a period of the periodic lines equal to a minimum wavelength of the input optical beam divided by an index of refraction of a surrounding material of the first and second substrates.

9. The apparatus of claim 1, wherein a width of the in-coupling diffraction element in a direction perpendicular to the periodic lines is different from a corresponding width of the further in-coupling diffractive element in a direction perpendicular to the further periodic lines.

10. The apparatus of claim 1, wherein the two or more out-coupling diffractive elements, the in-coupling diffractive element, the one or more further out-coupling diffractive elements and the further in-coupling diffractive element have parallel periodic lines.

11. The apparatus of claim 1, further comprising one or more further substrates, positioned substantially parallel to the first and second substrates and in juxtaposed spaced relationship thereto, with in-coupling and out-coupling diffractive elements disposed on respective surfaces of said one or more further substrates, wherein each of said one or more further substrates with the disposed diffractive elements is substantially identical to said first substrate with the in-coupling diffractive element and the one or more out-coupling diffraction element or to said second substrate with the further in-coupling diffractive element and the one or more further out-coupling diffraction elements.

12. The apparatus of claim 1, further comprising one or more further substrates, positioned substantially parallel to the first and second substrates and in juxtaposed spaced relationship thereto, with in-coupling and out-coupling diffractive elements disposed on respective surfaces of said one or more further substrates, wherein each of said one or more further substrates with the disposed diffractive elements is configured to perform a non-symmetric exit pupil extension for larger incidence angles of said input optical beam than said first substrate with the in-coupling diffractive element and the one or more out-coupling diffraction element or said second substrate with the further in-coupling diffractive element and the one or more further out-coupling diffraction elements.

13. The apparatus of claim 1, further comprising one or more further substrates, positioned substantially parallel to the first and second substrates and in juxtaposed spaced relationship thereto, with in-coupling and out-coupling diffractive elements disposed on respective surfaces of said one or more further substrates, wherein each of said one or more further substrates with the disposed diffractive elements is configured to perform a symmetric exit pupil extension only for smaller incidence angles of said input optical beam than said first substrate with the in-coupling diffractive element and the one or more out-coupling diffraction element or said second substrate with the further in-coupling diffractive element and the one or more further out-coupling diffraction elements.

14. The apparatus of claim 1, wherein a material surrounding the first and second substrates is air.

15. The apparatus of claim 1, further comprises one or more intermediate diffractive elements disposed on the first substrate and one or more further intermediate diffractive elements disposed on the second substrate such that at least parts of the input optical beam diffracted in the in-coupling diffractive element and in the further in-coupling diffractive element are first coupled to corresponding said one or more intermediate diffractive elements and said one or more further intermediate diffractive elements, which are configured to further couple by diffraction corresponding optical beams to the one or more out-coupling diffractive elements and to the one or more further out-coupling diffractive elements, for providing one or more output optical beams and one or more further output optical beams with said expanded exit pupil in said two dimensions.

16. The apparatus of claim 1, wherein said input optical beam is emanated from a virtual image of a display or a microdisplay.

17. The apparatus of claim 1, wherein grooves of said in-coupling diffractive element or said further in-coupling diffractive element have an asymmetric groove shape and are slanted gratings.

18. A method, comprising:
receiving an input optical beam by an in-coupling diffractive element disposed on a first or a second surface of a first substrate, wherein the first surface defines a first plane and wherein the second surface is opposite to the first surface;
diffracting optical rays of the input optical beam, which are incident from one half space relative to a second plane perpendicular to said first plane and parallel to periodic lines of the in-coupling diffractive element, using said in-coupling diffractive element disposed on the first or the second surface, so as to provide one diffracted optical beam substantially within said first and second surfaces such that at least a portion of said one diffracted optical beam is coupled only to one of one or more out-coupling diffractive elements disposed on the first or the further second surface of the first substrate;
coupling by diffraction parts of said one diffracted optical beams from the first substrate using said one of said one or more out-coupling diffractive elements for providing an output optical beam out of said first substrate with an expanded exit pupil in one or two dimensions, and propagating said output optical beam through a second substrate, said second substrate being positioned substantially parallel to the first substrate and in juxtaposed spaced relationship hereto;

receiving a portion of said input optical beam which propagates through said first substrate into the second substrate, by a further in-coupling diffractive element disposed on a further first or a further second surface of the second substrate substantially in alignment with said in-coupling diffractive element and having further periodic lines parallel to said periodic lines of the in-coupling diffractive element, wherein the further second surface is opposite to the further first surface;

diffracting optical rays of the portion of the input optical beam, which are incident from the other half space relative to said second plane, using said further in-coupling diffractive element to provide a further one diffracted optical beam substantially within said further first and further second surfaces such that at least a portion of said further one diffracted optical beam is coupled only to one of said one or more further out-coupling diffractive elements which is opposite to said only one of the one or more out-coupling diffractive elements to which said one diffracted optical beam is coupled; and coupling by diffraction parts of said further one diffracted optical beam from the second substrate using said one of said one or more further out-coupling diffractive elements for providing a further output optical beam out of said second substrate with said expanded exit pupil in said one or two dimensions.

19. The method of claim 18, further comprising:

diffracting optical rays of the input optical beam, which are incident from said other half space relative to said second plane, to provide another diffracted optical beam substantially within said first and second surfaces such that at least a portion of said another diffracted optical beam is coupled only to another of said one or two out-coupling diffractive elements, wherein said another of said one or more out-coupling diffractive elements disposed on the first or the second surface of the first substrate;

coupling by diffraction parts of said another diffracted optical beam from the first substrate using another of said one or more out-coupling diffractive elements for providing another output optical beam out of said first substrate with an expanded exit pupil in one or two dimensions, and propagating said another output optical beam through the second substrate;

diffracting optical rays of said portion of the input optical beam, which are incident from said one half space relative to said second plane, using said further in-coupling diffractive element to provide a further another diffracted optical beam substantially within said further first and further second surfaces such that at least a portion of said further another diffracted optical beam is coupled only to another of the one or more further out-coupling diffractive elements which is opposite to said another of the one or more out-coupling diffractive elements; and coupling by diffraction parts of said further another diffracted optical beam from the second substrate using said another of said one or more further out-coupling diffractive elements for providing a further another output optical beam out of said second substrate with said expanded exit pupil in said one or two dimensions.

20. The method of claim 19, wherein the one and another of said one or more out-coupling diffractive elements are symmetrical relative to the in-coupling diffractive element and the one and another of the one or more further out-coupling diffractive elements are symmetrical relative to the further in-coupling diffractive element.

21. The method of claim 19, wherein distances from the one and another of said one or more out-coupling diffractive elements to the in-coupling diffraction element are different than corresponding distances from the one and another of the one or more further out-coupling diffractive elements to the further in-coupling diffractive element.

22. The method of claim 19, wherein, when using identical materials and identical surrounding material for the first and second substrates, the in-coupling diffractive element has a period of the periodic lines equal to a maximum wavelength of the input optical beam divided by an index of refraction of the first and second substrates, and the further in-coupling diffractive element has a further period of the further periodic lines equal to a minimum wavelength of the input optical beam divided by an index of refraction of a surrounding material of the first and second substrates, or when using identical materials and identical surrounding material for the first and second substrates, the further in-coupling diffractive element has a further period of the further periodic lines equal to a maximum wavelength of the input optical beam divided by an index of refraction of the first and second substrates, and the in-coupling diffractive element has a period of the periodic lines equal to a minimum wavelength of the input optical beam divided by an index of refraction of a surrounding material of the first and second substrates.

23. The method of claim 19, wherein the two or more out-coupling diffractive elements, the in-coupling diffractive element, the one or more further out-coupling diffractive elements and the further in-coupling diffractive element have parallel periodic lines.

24. An electronic device, comprising:

a data processing unit;

an optical engine configured to receive image data from the data processing unit;

a display device configured to form an image based on the image data; and an exit pupil expander comprising:

a first substrate of optical material having a first surface and a second surface which is opposite to the first surface, wherein the first surface defines a first plane;

an in-coupling diffractive element disposed on the first or the second surface of said first substrate;

one or more out-coupling diffractive elements disposed on the first or the second surface, wherein said in-coupling diffractive element is configured to diffract optical rays of the input optical beam, which are incident from one half space relative to a second plane perpendicular to said first plane and parallel to periodic lines of the in-coupling diffractive element, so as to provide one diffracted optical beam substantially within said first and second surfaces such that at least a portion of said one diffracted optical beam is coupled only to one of said one or more out-coupling diffractive elements;

a second substrate of optical material having a further first surface and a further second surface and being positioned substantially parallel to the first substrate and in juxtaposed spaced relationship hereto, wherein the further second surface is opposite to the further first surface;

a further in-coupling diffractive element disposed on the further first or the further second surface substantially in alignment with said in-coupling diffractive element and having further periodic lines parallel to said periodic lines of the in-coupling diffractive element, and configured to receive a portion of said input optical beam which propagates through said first substrate into the further substrate; and one or more further out-coupling diffractive elements disposed on the further first or the further second surface and each being substantially opposite to a corresponding diffractive element of said one or more out-coupling diffractive elements, wherein said further in-coupling diffractive element is configured to diffract optical rays of the portion of the input optical beam, which are incident from the other half space relative to said second plane, to provide a further one diffracted optical beam substantially within said further first and further second surfaces such that at least a portion of said further diffracted optical beam is coupled only to one of said one or more further out-coupling diffractive elements which is opposite to said only one of the one or more out-coupling diffractive elements to which said one diffracted optical beam is coupled, and wherein said one of the one or more out-coupling diffractive elements is configured to couple by diffraction parts of said one diffracted optical beam from the first substrate for providing an output optical beam out of said first substrate with an expanded exit pupil in one or two dimensions, said output optical beam being propagated through said second substrate, and said one of the one or more further out-coupling diffractive elements is configured to couple by diffraction parts of said further one diffracted optical beams from the second substrate for providing a further output optical beam out of said second substrate with said expanded exit pupil in said one or two dimensions.

25. The electronic device of claim 24, wherein said in-coupling diffractive element is further configured to diffract optical rays of the input optical beam, which are incident from said other half space relative to said second plane, to provide another diffracted optical beam substantially within said first and second surfaces such that at least a portion of said another diffracted optical beam is coupled only to another of said one or two out-coupling diffractive elements, wherein said further in-coupling diffractive element is configured to diffract optical rays of said portion of the input optical beam, which are incident from said one half space relative to said second plane, to provide a further another diffracted optical beam substantially within said further first and further second surfaces such that at least a portion of said further another diffracted optical beam is coupled only to another of said one or two further out-coupling diffractive elements which is opposite to said another of the one or more out-coupling diffractive elements, wherein said one and another of the one or more out-coupling diffractive elements are configured to couple by diffraction parts of said one and another diffracted optical beams from the first substrate for providing two output optical beams out of said first substrate with the expanded exit pupil in one or two dimensions, said output optical beams being propagated through said second substrate, and said one and another of the further one or more diffractive elements are configured to couple by diffraction parts of said further one and further another diffracted optical beams from the second substrate for providing two further output optical beams out of said second substrate with the expanded exit pupil in said one or two dimensions.

* * * * *